United States Patent [19]

Davis

[11] Patent Number: 4,664,689

[45] Date of Patent: May 12, 1987

[54] METHOD AND APPARATUS FOR RAPIDLY COOLING OPTICAL FIBER

[75] Inventor: Robert B. Davis, Nyack, N.Y.

[73] Assignee: Union Carbide Corporation, Danbury, Conn.

[21] Appl. No.: 833,147

[22] Filed: Feb. 27, 1986

[51] Int. Cl.⁴ .................. C03C 25/02; C03B 37/023
[52] U.S. Cl. ............................ 65/3.11; 65/3.43; 65/11.1; 65/12; 427/299; 427/163
[58] Field of Search ............... 65/3.11, 3.43, 11.1, 65/12, 115; 427/163, 299

[56] References Cited

U.S. PATENT DOCUMENTS

| | | | |
|---|---|---|---|
| 3,374,074 | 3/1968 | Russell | 65/2 |
| 4,125,644 | 11/1978 | Ketley et al. | 427/36 |
| 4,214,884 | 7/1980 | Martin | 65/12 |
| 4,302,230 | 11/1981 | MacChesney et al. | 65/3.12 |
| 4,388,093 | 6/1983 | Kimura et al. | 65/3.11 |
| 4,455,159 | 6/1984 | Lamb et al. | 65/3.11 |
| 4,514,205 | 4/1985 | Darcangelo et al. | 65/12 |

OTHER PUBLICATIONS

Paek et al., *Forced Convective Cooling of Optical Fiber in High-Speed Cooling*, J. Appl. Phys. 50(10), Oct. 1979, pp. 6144–6148.

*High Speed Coating of Optical Fiber with UV Curabbe Materials at a Rate of Greater than 5M/SEC*, Applied Optics, vol. 20, No. 23, Dec. 1, 1981, pp. 4028–4034.

Primary Examiner—Robert Lindsay
Attorney, Agent, or Firm—Stanley Ktorides

[57] ABSTRACT

A method and apparatus for rapidly cooling optical fiber comprising passing optical fiber through an enclosure having a flat black internal surface, the walls of said enclosure having symmetrically oriented perforations or other symmetrically oriented means of passing cryogenic gas through the walls to contact optical fiber within the enclosure, the enclosure surrounded by a gas plenum to which gas is supplied to facilitate the symmetrical passage of cryogenic gas through the walls, whereby the cryogenic gas symmetrically contacts and cools the optical fiber and also serves to cool the walls of the enclosure.

18 Claims, 1 Drawing Figure

METHOD AND APPARATUS FOR RAPIDLY COOLING OPTICAL FIBER

TECHNICAL FIELD

This invention relates to the manufacture of optical fiber.

BACKGROUND ART

The use of optical fibers as a means of transferring information has become increasingly more widespread because of advantages over conventional wire transmission means such as very high informaion carrying capacity and improved resistance to external interference. Such industries as telecommunications, computer links, and data base access are among the fields which are making increasing use of optical fibers.

Optical fibers are produced by heating a petreated or preformed glass or quartz rod to its softening point, which generally is in excess of 1600° C., and drawing a thin strand from the rod which cools to become optical fiber.

The purity of the optical fiber is very important for the attainment of its advantageous high carrying capacity. One very serious source of impurities is the ambient air which can impart impurities to the drawn fiber. In order to mitigate this potential problem those skilled in the art coat newly drawn optical fibers with a barrier, such as a polymer coating, which serves to keep airborne impurities from containing the optical fiber.

Another potential problem with optical fibers is their lack of structural strength due primarily to their very thin diameters. Stress faults in an optical fiber can also cause a sharp diminution in their information carrying capacity. Fortunately the aforementioned barrier coating can also serve as a structural support for the optical fiber.

As mentioned previously the temperature of optical fiber is at least about 1600° C. as it is being drawn. However the temperatures of the optical fiber must be below about 90° C. when the barrier coating is applied because at temperature above about 90° C. the coating meniscus collapses resulting in a non-uniform coating thickness and a potentially ineffective coating.

One way to cool the optical fiber is to draw it through a long distance from the originating rod to the coating operation. However this method is disadvantageous because it is time consuming, takes up valuable production space, and subjects the optical fiber to contamination and stress through the long distance.

Another way to cool the optical fiber is to pass it through a cryogenic gas. However, because of the relatively small heat capacity of the gas, the cooling rate is still not very high and therefore it still takes a relatively long time, and also a large amount of cryogenic gas to cool the optical fiber to the requisite temperature for coating.

Yet another method for cooling optical fiber is to pass the optical fiber in contact with liquid quenchant. This method sharply decreases the required cooling time but has the disadvantage of the potential for mechanical interference with the optical fiber causing a compromise in its structural integrity. This is because the density of the liquid is high and may approach that of the optical fiber. This problem does not arise with the use of cryogenic gas as coolant because of the relatively low density of the cryogenic gas.

It is therefore desirable to have a process and apparatus which can rapidly cool an optical fiber without interfering substantially with its structural integrity.

It is an object of this invention to provide a method and apparatus for the rapid cooling of optical fiber by the use of cryogenic gas as the coolant.

SUMMARY OF THE INVENTION

The above and other objects which will become apparent to one skilled in the art upon a reading of this disclosure, are attained by the present invention, one aspect of which is:

An optical fiber cooler comprising:

(a) a central enclosure having an axial length, an inlet end, and an outlet end, said enclosure having a means for passing cryogenic gas substantially symmetrically through, and a flat black internal surface along, its axial length, and further having a restriction plate across each of said inlet and said outlet end, each restriction plate having an orifice therethrough of a size sufficient to enable the passage of optical fiber;

(b) an insulated outer enclosure spaced from the central enclosure, axially along the central enclosure from about the outlet end to a point short of the inlet end; and (c) a cryogenic gas supply conduit passing through the insulated outer enclosure, in flow communication with the space between the central enclosure and the insulated outer enclosure proximate said outlet end, and connected to a source of cryogenic fluid.

Another aspect of this invention is:

A process for rapidly cooling optical fiber from a temperature of about 1000° C. or more to a temperature below about 90° C. comprising:

(a) drawing optical fiber having a temperature of about 1000° C. or more into an enclosure having means for passing cryogenic gas substantially symmetrically through, and a flat black internal surface along, its axial length;

(b) passing the optical fiber through the axial length of the enclosure;

(c) passing cryogenic gas through said means substantially symmetrically through the axial length of, and into, the enclosure to cool the enclosure:

(d) contacting the optical fiber with gas within the enclosure as it passes along substantially the entire axial length of the enclosure; and (e) withdrawing the optical fiber from the enclosure at a temperature of less than about 90° C.

As used herein, the term "optical fiber" means a fiber used in lightwave communication exhibiting low loss, high capacity for transmitting information, precise geometry and high strength.

As used herein, the term "flat black surface" means a surface which is a near perfect absorber of heat or substantially a black body. The term, black body, is well known to the art and is used to describe a surface where all of the radiant energy incident on the surface is absorbed by the surface.

As used herein, the term "cryogenic gas" means a gas having a temperature below about −40° C.

DETAILED DESCRIPTION

Figure 1:
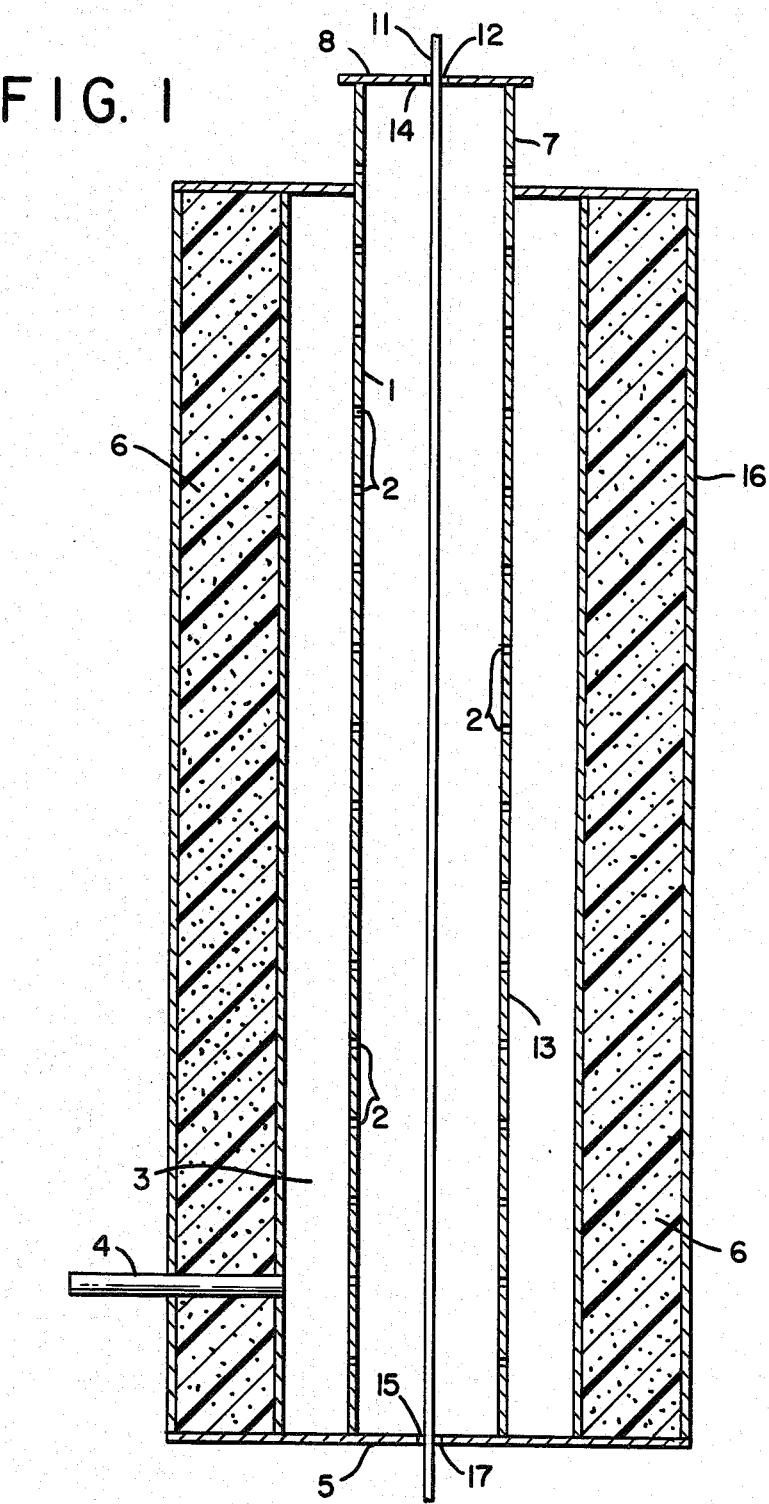
FIG. 1 is a cross-sectional representation of one preferred embodiment of the optical fiber cooler of this invention which may be used to carry out the process of this invention.

The process and apparatus of this invention will be described in detail with reference to FIG. 1.

Referring now to FIG. 1, optical fiber 11 which is at a temperature of about 1000° C. or more is drawn through an orifice 12 in inlet restriction plate 8 which is across inlet 14 to central enclosure 13. The optical fiber is drawn from a rod of glass or quartz material which has been heated to at least its softening point which is generally about 1600° C. At the time that the optical fiber enters the central enclosure it has a diameter which is generally less than about 0.010 inch and usually about 0.005 inch. The temperature of the optical fiber as it is drawn into the cooler is somewhat less than the softening point and generally is about 1000° C.

Central enclosure 13 has an axial length which runs from inlet 14 to outlet 15 and it can have any effective geometry. Preferably central enclosure 13 has a cylindrical geometry, i.e. is a pipe. Along its axial length central enclosure 13 has means for passing cryogenic gas substantially symmetrically therethrough. FIG. 1 illustrates a preferred embodiment where such means is a plurality of perforations 2. The perforations could be of any effective crosssection such as holes, slots, and the like. Other means for passing cryogenic gas comprise the interstices in porous sintered metal. It is important that the means enable the cryogenic gas to pass through the wall of central enclosure 13 in a substantially symmetrical fashion in order to achieve even cooling of the fiber and avoid pushing the fiber to one side as it passes through the cooler. Uneven cooling or uneven pressure on the optical fiber as it is being cooled could be detrimental to the optical fiber.

Also along its axial length on its internal surface 1, central enclosure 13 has a flat black surface. Any effective way of achieving a flat black surface is acceptable for the practice of this invention. One preferred way of achieving a flat black surface is to chemically treat the inside surface of central enclosure 13 with a solution of liver of sulfur or sodium sulfide.

Spaced from central enclosure 13 and running axially along the central enclosure from about its outlet end to a point short of its inlet end is insulated outer enclosure 16. The spacing 3 between outer enclosure 16 and central enclosure 13 forms a cryogenic gas plenum which will be more fully described below. Outer enclosure 16 is insulated along its length with insulation 6 which may be any effective insulation such as polyurethane foam, styrofoam, polyethylene foam, low density perlite powder, and the like. The preferred insulation is polyurethane foam.

Passing through outer enclosure 16 and in flow communication with cryogenic gas plenum 3 at a point proximate the outlet end 15 of the central enclosure is cryogenic gas supply conduit 4. Supply conduit 4 is connected to a source of cryogenic fluid which may be cryogenic gas or cryogenic liquid. One preferred arrangement would be a tank or other container which can store a supply of cryogenic liquid which is mixed with warm gas to provide a cold gas stream which passes through supply conduit 4.

Any cryogenic gas which does not significantly adversely affect the optical fiber can be employed in the practice of this invention. Among such cryogenic gases one can name nitrogen, helium, argon, hydrogen, and the like. Nitrogen is preferred because of its comparatively lower cost.

In operation, as optical fiber 11 is drawn through central enclosure 13, cryogenic fluid is passed through supply conduit 4 and into plenum 3. Heat from the optical fiber is radiated to internal surface 1 of central enclosure 13 which because of its flat black surface absorbs nearly all of this radiated heat; virtually none of this radiated heat is re-radiated back to the optical fiber. The central enclosure wall, which is made of heat conductive material such as copper, brass, aluminum or stainless steel is then heated by this radiated heat.

The cryogenic gas supplied to plenum 3 impinges the central enclosure wall and thereby cools the wall to sustain the radiation heat gradient and further reduce whatever heat might be re-radiated back to the optical fiber. The cryogenic gas in plenum 3 then passes through the plurality of substantially symmetrically oriented perforations 2 and contacts the optical fiber radially and at low velocity as the optical fiber passes through the axial length of central enclosure 13. As the cryogenic gas contacts the optical fiber, heat from the optical fiber is conducted from the optical fiber to the cryogenic gas.

As shown in FIG. 1 central enclosure 13 extends past insulated outer enclosure 16. Within this uninsulated extension 7, the cryogenic gas undergoes heating and expansion, and consequent passage out of the optical fiber cooler through the perforations in the extension 7 wall. This causes rapid cooling of that inlet portion and also sets up a flow of cryogenic gas which runs countercurrent to the direction in which the optical fiber is drawn. This countercurrent gas flow removes heat from the optical fiber by convection.

It is thus seen that the optical fiber experiences rapid heat loss throughout its passage through the optical fiber cooler. Initially, when it is at a very high temperature, the optical fiber sees relatively warm gas which has been warmed but is still at a temperature considerably below that of the optical fiber. As the optical fiber passes through the axial length of the cooler and as it gets cooler and cooler, it progressively sees gas which itself is cooler and cooler thus keeping up a very high heat transfer rate. And as the optical fiber passes through the cooler axial length it is continually and efficiently loosing heat through all three modes of heat transfer, i.e. radiation, conduction and convection.

As a result, when the optical fiber passes through orifice 17 in restriction plate 5 which is across the outlet end of central conduit 13, the optical fiber has a temperature which is less than about 90° C., and generally is less than about 80° C., thus enabling the effective application of a polymeric or other coating onto the fiber. The coating may then be cured by any effective means such as by ultraviolet radiation.

The optimum axial length of the optical fiber cooler of this invention will vary depending on such factors as the type of optical fiber being cooled, the type of cryogenic fluid employed and the speed of the other optical fiber manufacturing steps upstream and downstream of the cooling step. Generally the axial length of the central enclosure will be in the range of from 3 to 10 feet and preferably is in the range of from about 3 to 6 feet. The time required for the optical fiber to traverse the axial length of the optical fiber cooler of this invention will also vary depending on the above-described factors. Generally the time for passage will be in the range of from about 0.1 to 2.0 seconds and preferably is in the range of from about 0.5 to 1.5 seconds.

Now by the use of the process and apparatus of this invention one can rapidly cool optical fiber from the very high temperature at which it is when it is drawn from a rod to the low temperature required for the effective application of a surface coating on the optical fiber, while avoiding the need to contact the optical fiber with a cooling medium which has a density which can inflict damage to the optical fiber.

Although the process and apparatus of this invention have been described with reference to a specific embodiment, it will be recognized by those skilled in the art that there are other embodiments of this invention within the spirit and scope of the claims.

I claim:

1. An optical fiber cooler comprising:
   (a) a central enclosure having an axial length, an inlet end, and an outlet end, said enclosure having means for passing cryogenic gas substantially symmetrically through the wall and a flat black internal surface, along its axial length, and further having a restriction plate across each of said inlet and said outlet end, each restriction plate having an orifice therethrough of a size sufficient to enable the passage of optical fiber;
   (b) an insulated outer enclosure spaced from the enclosure to form a gas plenum, axially along the central enclosure from about the outlet end to a point short of the inlet end; and
   (c) a cryogenic gas supply conduit passing through the insulated outer enclosure, in flow communication with the gas plenum proximate said outlet end, and connected to a source of cryogenic fluid.

2. The cooler of claim 1 wherein the axial length of the central enclosure is in the range of from about 3 to 10 feet.

3. The cooler of claim 1 wherein the central enclosure is cylindrical.

4. The cooler of claim 1 wherein the central enclosure is made from heat conductive material from the group comprising copper, brass, aluminum and stainless steel.

5. The cooler of claim 1 wherein said cryogenic gas passing means comprises a plurality of perforations.

6. The cooler of claim 5 wherein said perforations comprise holes.

7. The cooler of claim 5 wherein said perforations comprise slots.

8. The cooler of claim 1 wherein said cryogenic gas passing means comprise intersticial spaces in porous sintered metal.

9. A process for rapidly cooling optical fiber from a temperature of about 1000° C. or more to a temperature below about 90° C. comprising:
   (a) drawing optical fiber having a temperature of about 1000° C. or more into an enclosure having means for passing cryogenic gas substantially symmetrically through its wall and a flat black internal surface, along its axial length;
   (b) passing the optical fiber through the axial length of the enclosure;
   (c) passing cryogenic gas to a gas plenum adjacent the wall and through said means substantially symmetrically through said wall along the axial length of, and into, the enclosure to cool the enclosure;
   (d) contacting the optical fiber with gas within the enclosure as the optical fiber passes along substantially the entire axial length of the enclosure; and
   (e) withdrawing the optical fiber from the enclosure at a temperature of less than about 90° C.

10. The process of claim 9 wherein the optical fiber is drawn through the axial length of the enclosure in a time within the range of from about 0.1 to 2.0 seconds.

11. The process of claim 9 wherein said cryogenic gas is nitrogen.

12. The process of claim 9 further comprising contacting the outside surface of the enclosure with cryogenic gas.

13. The process of claim 9 wherein the optical fiber is drawn from a quartz rod prior to being passed into the enclosure.

14. The process of claim 9 further comprising passing the gas through the enclosure countercurrent to the direction that the optical fiber is drawn through the enclosure.

15. The process of claim 9 further comprising passing the gas out of the enclosure at a location proximate the point where the optical fiber is drawn into the enclosure.

16. The process of claim 9 further comprising coating the optical fiber after it is withdrawn from the enclosure with a protective coating.

17. The process of claim 16 wherein said protective coating is a curable polymeric coating.

18. The process of claim 17 wherein said curable polymeric coating is cured by ultraviolet radiation.

* * * * *

UNITED STATES PATENT AND TRADEMARK OFFICE
CERTIFICATE OF CORRECTION

PATENT NO. : 4,664,689

DATED : May 12, 1987

INVENTOR(S) : Robert B. Davis

It is certified that error appears in the above-identified patent and that said Letters Patent is hereby corrected as shown below:

In column 1, line 19 delete "petreated" and insert therefor --pretreated--.

In claim 1, line 11 between "the" and "enclosure" insert --central.

Signed and Sealed this

Twenty-fifth Day of August, 1987

Attest:

DONALD J. QUIGG

Attesting Officer  Commissioner of Patents and Trademarks